Feb. 24, 1970 R. W. KRUG 3,497,609
TELEVISION POWER SUPPLY CIRCUIT
Filed Feb. 23, 1967
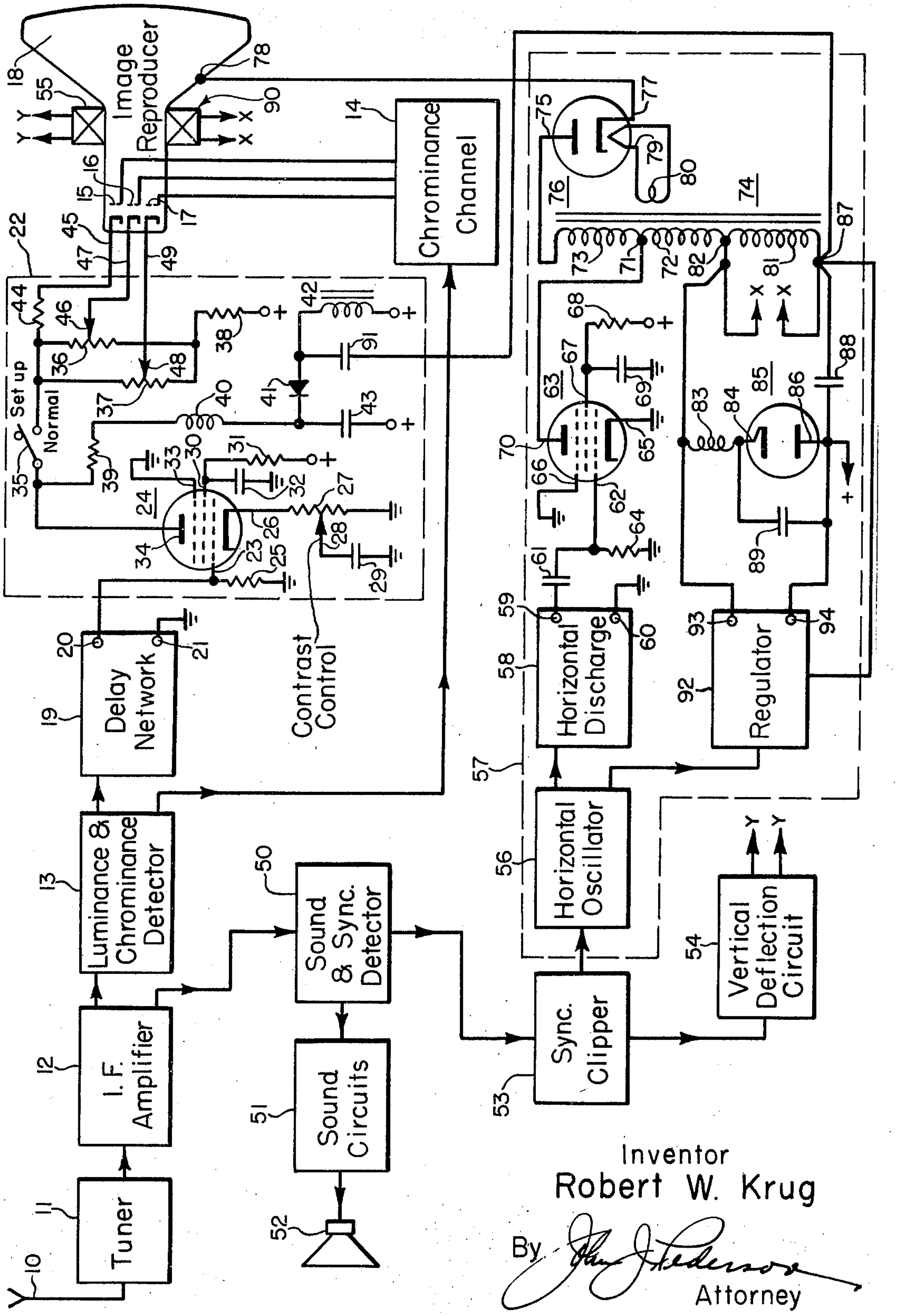
Inventor
Robert W. Krug
By [signature]
Attorney United States Patent Office 3,497,609
Patented Feb. 24, 1970

3,497,609
TELEVISION POWER SUPPLY CIRCUIT

Robert W. Krug, Oak Park, Ill., assignor to Zenith Radio Corporation, Chicago, Ill., a corporation of Delaware Filed Feb. 23, 1967, Ser. No. 618,136
Int. Cl. H04n *5/44*
U.S. Cl. 178—5.4 1 Claim

ABSTRACT OF THE DISCLOSURE

To avoid block compression and degradation of picture detail in a color television receiver without providing a larger and more costly power supply than conventionally employed in such receivers, a luminance amplifier stage has a video amplifier device which is operable from a voltage in excess of the receiver B+ voltage. The luminance amplifier stage includes a passive oscillatory circuit which is excited into oscillation by recurrent pulses derived elsewhere within the receiver, preferably the same line-rate pulses derived from the horizontal sweep system which are used to develop the conventional B-boost voltage. Voltage excursions resulting from this oscillation are unidirectionally impressed on a filter capacitor, thereby developing a D.C. voltage which is added to the B+ voltage to provide an elevated operating voltage for the amplifier device. This permits use of a picture tube having remote cutoff characteristics for improved spot size and also permits tighter D.C. coupling from the chrominance channel to the control grids of the picture tube for improved color fidelity.

BACKGROUND OF THE INVENTION

The present invention relates to improvements in color television receiving systems and more particularly to an improved luminance amplifier for use therein.

In accordance with present United States standards governing color and monochrome television transmissions, a transmitted television signal includes a luminance signal component which conveys brightness information and a chrominance signal component which conveys color hue and saturation information in the scene being televised. For accurate reproduction of the televised scene, it is necessary that both of these components be applied to the receiver's image reproducer, which in present-day receivers takes the form of a tri-color shadow mask cathode-ray tube having independent electron guns for each of three primary colors; red, blue and green. It is the usual practice in such receivers to process the luminance and chrominance signal components separately, after which the luminance signal is applied to the cathodes of the three guns and the chrominance signal, in the form of three color difference signals representing the difference between the luminance component and each of the three primary color components, is concurrently applied to the control grids of the respective ones of the guns.

The luminance signal thus applied to the image reproducer is processed in a luminance channel which may contain one or more luminance amplifier stages. The last amplifier stage of the luminance channel generally comprises a high-mu pentode type vacuum tube having an anode circuit direct-current (DC) coupled to the three cathodes of the image reproducer.

To obtain black in the reproduced image, each of these three guns is driven into cut-off by applying an increased positive potential to their cathodes. Since it is actually the grid-to-cathode potential that controls, it is necessary that the applied cathode potential exceed any applied positive control grid potential, which, for reasons of color fidelity must often be equal to the anode operating voltage of the color-difference signal amplifiers. The maximum potential available at the three cathodes is determined primarily by the operating voltage supplied to the anode of the final video amplifier, which in prior art receivers is the output voltage of the receiver B+ power supply. Unfortunately, this voltage is not always adequate, and complete cut-off of the image reproducer often can not be obtained without driving the last luminance amplifier stage into complete cut-off, which is undesirable because it results in non-linear operation of that stage and deleterious black compression in the reproduced image. Heretofore, the only solutions have been to decrease the cut-off voltage of the image reproducer, thereby degrading picture detail, or to increase the voltage output of the receiver B+ supply. The latter solution is often impractical because of the greater cost of power supply components suitable for operation at the increased voltage.

Another disadvantage of prior art luminance amplifiers is that it has been difficult to obtain the desired degree of direct current transmission, i.e., proportion of direct current to alternating current luminance components applied to the image reproducer, for optimum image reproduction. Often the required degree of transmission can be obtained only with the addition of an extra video amplifier stage or by sacrificing overall gain through the luminance channel.

SUMMARY OF THE INVENTION

Accordingly, it is an object of the invention to provide a new and improved luminance amplifier offering improved linearity over prior art amplifiers.

It is another object of the invention to provide a new and improved luminance amplifier which has increased capability to cut off an associated image reproducer without objectionable black-compression in the reproduced image.

It is still another object of the invention to provide a new and improved luminance amplifier which functions to increase the transmission of direct current luminance signals to a color television picture tube.

The invention is directed to a video amplifier stage for use in a television receiver having a source of recurrent pulses and a source of unidirectional supply potential. The stage comprises an amplifier device operable from a potential in excess of the unidirectional supply potential. Means comprising a passive oscillatory circuit responsive to the recurrent pulses are included for producing a voltage oscillation. Further included are means for rectifying the voltage oscillation to provide a rectified voltage and for superimposing the rectified voltage on the unidirectional supply potential to develop a unidirectional operating potential in excess of the supply potential. Means including a load impedance are provided for applying at least a portion of the developed operating potential to the amplifier device.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in which the single figure is a schematic diagram of a color television receiver which includes a luminance amplifier constructed in accordacne with a preferred embodiment of the invention, convention stages of the receiver being shown in block diagram form.

DESCRIPTION OF THE PREFERRED EMBODIMENT

The television receiver illustrated in the figure comprises an antenna 10 coupled in a conventional manner to a tuner 11, which includes the usual radio frequency amplifying and heterodyning stages. The intermediate-frequency output of tuner 11 is coupled to an intermediate-frequency amplifier 12 which, in turn, is coupled to a luminance detector 13. The video-frequency output of luminance detector 13 is applied to a chrominance channel 14 wherein chrominance information in the form of color-difference signals is derived for application to the red, blue and green control grids 15, 16 and 17 respectively, of image reproducer 18. The output of detector 13 is also applied to a delay network 19 and output of this network, which appears at terminals 20 and 21, is coupled to a luminance amplifier stage enclosed by dashed outline 22. Terminal 21 is grounded and terminal 20 is connected to the control grid 23 of an electron-discharge device 24. Control grid 23 is returned to ground by a resistor 25 and the cathode 26 of device 24 is connected to ground through the body of a contrast-control potentiometer 27. The arm 28 of contrast-control potentiometer 27 is connected to ground through a capacitor 29. The screen grid 30 of device 24 is connected to a source of positive unidirectional operating potential by a resistor 31 and is bypassed to ground by a capacitor 32. Suppressor grid 33 is connected to ground and anode 34 is connected to the receiver B+ power supply by two parallel plate load circuits. The first circuit serially comprises a single-pole single-throw switch 35, parallel-connected potentiometers 36 and 37 and a resistor 38.

The second plate load circuit serially comprises a resistor 39, a shunt-peaking inductance 40, a diode 41 and an inductance 42. The juncture of inductance 40 and the cathode of diode 41 is bypassed to the receiver B+ power supply, and thence to ground, by a capacitor 43. Anode 34 is further connected by a resistor 44 to the red cathode 45 of image reproducer 18. Arm 46 of potentiometer 36 is connected to the blue cathode 47 and arm 48 of potentiometer 37 is connected to the green cathode 49 of image reproducer 18.

The amplified intermediate frequency signal from intermediate frequency amplifier 12 is also applied to sound and sync detector 50, wherein a composite video-frequency signal is derived which includes both sound and synchronizing components. The sound components of this composite signal are applied to sound circuits 51, wherein conventional sound demodulation and amplification circuitry is utilized to develop an audio output signal for application to speaker 52.

Synchronizing information, in the form of horizontal and vertical sync pulses, is separated from the composite signal by a sync clipper 53. Vertical deflection circuit 54 utilizes the vertical sync pulses to generate a synchronized vertical-rate sawtooth scanning signal in vertical deflection coils 55. Horizontal sync pulses from sync clipper 53 are applied to horizontal oscillator stage 56, part of the receiver horizontal deflection system enclosed by dashed outline 57. This stage includes a sinewave oscillator and appropriate reactance control circuitry for generating a horizontal-rate wave signal synchronized to the received television transmission. This signal is coupled to horizontal discharge stage 58 wherein it is amplified and conditioned to develop a drive signal at output terminals 59 and 60 which resembles a sawtooth during scan interval and a steep negative-polarity pulse during retrace intervals. Terminal 60 is grounded and the drive signal is coupled by a capacitor 61 from terminal 59 to the control grid 62 of an electron-discharge amplifier device 63. A resistor 64 is connected between grid 62 and ground and the cathode and suppressor electrodes 65 and 66 respectively of device 63 are grounded. The screen grid 67 of device 63 is connected to a source of positive unidirectional operating potential by a screen dropping resistor 68 and is bypassed to ground by a capacitor 69.

The anode 70 of device 63 is connected to a juncture 71 formed by one terminal of the primary winding 72 and one terminal of the tertiary winding 73 of sweep transformer 74. The remaining terminal of tertiary winding 73 is connected to the anode 75 of a high voltage rectifier 76. The cathode 77 of rectifier 76 is connected to the ultor electrode 78 of image reproducer 18 and the filament 79 is connected across a winding 80 of sweep transformer 74.

The remaining terminal of primary winding 72 is connected to one terminal of another secondary winding 81 at a juncture 82. Juncture 82 is connected through an inductance 83 to the cathode 84 of a diode device 85, a conventional damper diode. Anode 86 of device 85 is connected to a positive unidirectional potential source, preferably the receiver B+ power supply, and to the remaining terminal 87 of secondary winding 81 by a capacitor 88.

A capacitor 89 is connected between cathode 84 and anode 86. The horizontal deflection winding 90 of image reproducer 18 is shunt-connected across secondary winding 81, and juncture 87, which comprises a source of boost potential for the receiver, is connected by a capacitor 91 to the juncture of the anode of diode 41 and inductance 42.

The receiver further includes a pulse-controlled high voltage regulator 92 which preferably is identical to the system claimed and described in the copending application of Stanley Bart, Ser. No. 567,466, assigned to the present assignee. The horizontal-rate wave signal generated by horizontal oscillator 56 is applied to regulator 92, wherein it serves as a gating control signal to permit operation of the regulator only during certain predetermined portions of each horizontal deflection cycle. Regulator 92 has a pair of output terminals 93 and 94 which are connected across secondary winding 81 of sweep transformer 74. Regulator 92 is further connected to the receiver boost potential source, juncture 87.

With the exception of certain detailed circuitry of video amplifier stage 22, the receiver is conventional in design, and accordingly only a brief description of the overall receiver operation need be given here. A received signal is intercepted by antenna 10, then amplified and translated to an intermediate-frequency by tuner 11. After amplification by intermediate-frequency amplifier 12, the signal is translated to a composite video-frequency signal by luminance and chrominance detectors 13. The luminance component of the translated composite signal, which represents brightness information in the televised image, is delayed for a predetermined period in delay network 19 before amplification in luminance amplifier 22 and subsequent application to the cathodes of image reproducer 18. The chrominance component, after demodulation and amplification in chrominance channel 14, is applied in the form of three color-difference signals to the control grids of respective ones of the guns of image reproducer 18. The concurrently applied luminance and color-difference signals matrix in image reproducer 18 to produce an image having brightness, hue and color saturation characteristics corresponding to the televised image.

The amplified intermediate frequency signal from intermediate frequency amplifier 12 is also applied to sound and sync detector 56, wherein a composite video-frequency signal is derived which includes both sound and synchronizing components. The sound components of this composite signal are applied to sound circuits 51, wherein conventional sound demodulation and amplification circuitry is utilized to develop an audio output signal for application to speaker 52.

Synchronizing information, in the form of horizontal and vertical sync pulses, is separated from the composite signal by sync clipper 53. Vertical deflection circuits 54 utilize the vertical sync pulses to generate a synchronized vertical-rate sawtooth scanning signal in vertical deflection winding 55. Horizontal sync pulses from sync clipper 53 are applied to horizontal oscillator stage 56, part of the receiver horizontal deflection system 57. This stage includes a sine-wave oscillator and appropriate reactance control circuitry for producing a horizontal-rate wave signal synchronized to the received television transmission. Horizontal discharge stage 58 amplifies and conditions the horizontal-rate wave signal to develop a drive signal at output terminals 59 and 60 which resembles a sawtooth during scan intervals and a steep negative-polarity pulse during retrace intervals. This drive signal is coupled by capacitor 61 to control grid 62 of electron discharge device 63. Resistor 64 provides a direct-current path to ground for grid 62. Device 63 is energized by the receiver B+ power supply through an output circuit which serially comprises primary winding 72, inductance 83, and diode 85. Resistor 68 serves as a conventional screen-dropping resistor for screen grid 67 and capacitor 69 is a conventional screen bypass capacitor.

In its general aspects, the operation of horizontal deflection system 57 is well known to the art. The drive signal applied to control grid 62 initiates conduction in device 63 at approximately the middle of the horizontal scanning cycle, and causes a linear increase in current until a maximum is reached immediately prior to the beginning of the retrace interval in the received television transmission. As the current in device 63 increases, the current in transformer windings 72 and 81 and deflecting winding 90 also increases, causing the electron beam to be deflected towards the right edge of the raster. When the current through deflection winding 90 has reached a maximum corresponding to the end of the horizontal scanning cycle, the drive signal applied to control grid 62 suddenly becomes negative and device 63 is driven sharply into cutoff. The sudden termination of current flow through winding 72 causes the magnetic field surrounding the secondary winding 81 and deflection winding 90 to collapse. This initiates a harmonic oscillation of approximately 95 kHz. in the equivalent tuned circuit consisting of deflection winding 90, transformer winding 81, capacitors 88 and 89 and the distributed stray and fixed capacities of the deflection circuit.

The current through deflection winding 90 reverses during the first quarter cycle of the induced oscillation and rises to a maximum in the reverse direction at the end of the second quarter cycle of oscillation. This rapid reversal of current flow through deflection winding 90 constitutes the fly-back or retrace interval during which the scannig beam of image reproducer 18 is rapidly returned from the right edge to the left edge of the raster. Although the counter EMF developed across deflection winding 90 during the first portion of retrace is applied to diode 85 through inductance 83 and capacitor 88, its polarity is such that device 85 does not conduct and has no damping effect on the oscillation. However, at the end of the first half-cycle of oscillation, the potential applied to diode 85 is reversed and diode 85 does conduct, damping out subsequent oscillations and causing a linearly decaying current in deflection winding 90. This sweeps the electron scanning beam from the left side to the center of the raster, at which point device 63 again becomes conductive to complete the scanning cycle.

The sudden termination of current flow at the beginning of the retrace interval generates a harmonic oscillation in high voltage tertiary winding 73. This oscillation is peak-rectified by high voltage rectifier 76 which, in conjunction with the internal capacity of image reproducer 18, develops an accelerating potential of approximately 25,000 volts at ultor electrode 78. Winding 80 is included for energizing the heater 79 of high voltage rectifier 76.

Regulator system 92 accomplishes regulation of the accelerating potential by variably loading tertiary winding 73 during the first quarter cycle of the harmonic oscillation induced in that winding. The effect of increased loading is to reduce the amplitude of the initial high voltage pulse at the beginning of retrace, which in turn reduces the potential at ultor electrode 78. To avoid electrical insulation problems regulator 92 is not connected directly across tertiary winding 73, but rather across secondary winding 81, and the mutual inductance between the two windings is relied upon to transfer the loading effect.

The degree of loading imposed by regulator 92 is directly dependent on the magnitude of the boost voltage developed at juncture 87. Since the bost potential is directly related to the accelerating potential applied to ultor electrode 78, by varying the loading effect of regulator 88 in response to this voltage it is possible to maintain the accelerating potential on image reproducer 18 substantially constant. To prevent regulator 92 from adversely affecting the width of the reproduced image, the horizontal-rate wave signal generated by horizontal oscillator 56 is utilized as a gating control signal which allows regulartor 92 to load winding 81 only during a small portion of the first half of the retrace interval.

The luminance output signal from delay network 19, which appears at terminals 20 and 21, is coupled to control grid 23 of amplifier device 24, a conventional pentode vacuum tube. Resistor 25 serves as a DC return-to-ground for this grid. The cathode 26 of device 24 is connected to ground by a partially bypassed cathode resistor in the form of potentiometer 27. By varying the position of arm 28, the amount of AC degeneration, and hence the AC gain of amplifier 24, is varied to control contrast in the reproduced image. Screen grid 30 is maintained at a positive potential by a conventional screen dropping resistor 31 bypassed to ground at video frequencies by a capacitor 32.

With switch 35 in the NORMAL position, the amplifier luminance signal from device 24 appears across two parallel plate load impedance circuits. The first of these comprises the parallel combination of potentiometers 36 and 37 in series with fixed resistor 38. The full amplified video signal is applied directly to the red cathode 45 of image reproducer 18 via resistor 44, which serves only to equalize the cathode impedance between this cathode and the blue and green cathodes, which have cathode impedance in the form of potentiometers 36 and 37. Slightly less amounts of the luminance signal, as determined by the positioning of arms 46 and 48 on potentiometers 36 and 37 are applied to the remaining blue and green cathodes, 47 and 49 respectively. The second plate load impedance circuit comprises the series combination of resistor 39, shunt-peaking inductance 40, and the equivalent impedance of capacitor 43, diode 41, capacitor 91 and inductance 42.

Operating potential for luminance amplifier device 24 is derived through the two plate load impedance circuits. In the case of the first circuit, the normal output voltage of the receiver B+ supply is available through resistor 38 and parallel-connected potentiometers 36 and 37. However, in the case of the second load circuit, a novel :ircuit arrangement of inductance 42 and capacitor 91 )ermits a voltage in excess of B+ to be present on anode ¦4. Inductance 42 and capacitor 91, which form a passive )scillatory circuit series-resonant at approximately 15 :Hz., are excited into oscillation by a 15 kHz. ripple :omponent conveniently derived in the present embodinent from juncture 87, the boost voltage source for the 'eceiver. The positive excursions of this oscillation are im)ressed by diode 41 on capacitor 43, which is effectively )ypassed to ground through the receiver B+ supply. ¦ince inductance 42 is also connected to the B+ power upply of the receiver, the voltage developed across ca)acitor 43 is approximately equal to the sum of the unilirectional B+ power supply potential, which here is 350 'olts, and the DC component derived by the action of liode 41. The voltage across capacitor 43, which in practice may exceed 420 volts, is impressed on anode 34 hrough inductance 40 and resistor 39 and has the net :ffect of raising the voltage available at that element to ¦85 volts, 35 volts greater than the 350 volt potential vhich would otherwise be available absent the oscillatory :ircuit of inductance 42 and capacitor 91.

The higher unidirectional operating voltage is of substantial advantage to the operation of luminance amplifier 22. For faithful color reproduction it is necessary hat the color difference signal amplifiers of the chromiiance channel be direct-current coupled to their respecive control grids, 15, 16 and 17, in image reproducer 18. This necessitates operating the control grids at the ame potential as the anode operating potential of these implifiers, which in the present embodiment is approxinately 175 volts. With conventional cathode-ray tube mage reproducers it is necessary that the individual guns :ach be operated at a relatively high cut-off potential to ichieve the small spot size necessary for good detail in he reproduced image. In practice, the screen grid potenial applied to the three guns is adjusted to cause each ;un to operate with a grid-to-cathode cut-off potential of .75 volts. It will be readily appreciated that this estabishes a requirement of 350 volts on each cathode to :ompletely extinguish the image reproducer. Switch 35 acilitates setting the image reproducer for a cut-off of ¦50 volts. In the SET-UP position only the 350 volt B+ )ower supply is connected to the three cathodes and the creen voltage of each gun is readily adjusted for cut-off.

With only a 350 volt B+ power supply, cut-off of mage reproducer 18 would be possible only with amplifier device 24 completely cut-off. Complete cut-off of )entodes such as device 24 is undesirable because of the ion-linear transfer characteristic associated with such )peration. This condition does not occur with the present nvention since, with approximately 420 volts across ca)acitor 43, device 24 can be partially conductive and yet ause the three electron beams of image reproducer 18 to )e cut-off.

Inductance 42 is preferably wound on a permanent nondjustable iron core and capacitor 91 has a value of .01 nicrofarad with a voltage rating of 1000 volts. Capacitor ¦3 has a value of .1 mfd. and requires a voltage rating )f only 200 volts since it is connected to the receiver B+ )ower supply instead of to ground. It will be appreciated hat the resonant circuit of inductance 42 and capacitor 1 could be made resonant at other frequencies besides 5 kHz., and that other means of exciting the circuit into scillation could be used, such as a separate winding on weep transformer 74.

It is worth noting that in a prior art television receiver ot incorporating the invention, image reproducer 18 could e operated at a cut-off of only 110 volts, while, with the ivention, a cut-off of 175 volts is possible with substanially the same circuit. This increase in cut-off voltage 'rings about a significant decrease in spot size and a coresponding increase in detail in the reproduced image.

Of course, it would be possible to raise the potential of the receiver B+ supply from 350 volts to 390 volts and accomplish substantially the same result. This would, however, result in a considerable increase in material cost by requiring larger power supply components, including a larger transformer, higher voltage filter capacitors and a larger choke. It would also require that certain dropping resistors contained within the receiver be increased in wattage. The circuit of the invention, which requires only the addition of an inductor, diode and capacitor, is inexpensive and lends itself to incorporation in existing television chassis without extensive redesign of the power supply or luminance amplifier circuitry.

A further advantage realized by a luminance amplifier constructed in accordance with the invention is that the effective DC transmission of the detected luminance signal to the image reproducer is increased. This is because of the inherent poor regulation of the resonant power supply. As the DC level of the video signal applied to control grid 23 increases, i.e., becomes less negative, the anode current through device 24 increases. This immediately brings about a substantial drop in the available anode potential, and this drop continues until the 350 volts B+ power supply becomes the only effective source of operating potential. After that point, only the normal voltage variation across plate load resistors 38 and 39 as a result of anode current variations are impressed on cathodes 45, 47 and 49. Therefore, the ultimate change in DC potential on cathodes 45, 47 and 49 is increased over what it would otherwise have been if only the voltage variation across the plate load resistors were available to transmit the DC level from control grid 23 to the image reproducer. This feature may be of significant advantage in sets which otherwise lack DC transmission capability because of circuit limitations in their delay network or preceding luminance amplifier stages.

A luminance amplifier constructed in accordance with the invention offers improved performance which could otherwise be obtained only at great expense. It permits the chrominance channel to be more tightly DC coupled to the control grids of the image reproducer for improved color fidelity without suffering black compression in the luminance amplifier. Only four inexpensive components are required, a diode, two capacitors and an inductance, and these components are readily added to existing color chassis designs.

While one particular embodiment of the present invention has been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

I claim.

1. In a color television receiver, the combination which comprises:

a color television picture tube having cathode, control and final anode electrodes and requiring a predetermined minimum voltage between said cathode and control electrodes for picture tube cut-off;

means including a sweep transformer and a high voltage rectifier coupled thereto for developing a final anode operating voltage for said picture tube;

a chrominance channel DC coupled to said control electrodes and maintaining the latter at a predetermined average bias voltage;

a DC coupled luminance amplifier comprising an electron-discharge device and an output load impedance coupled from the output electrode of said device to a source of operating voltage less than the sum of said picture tube control electrode average bias voltage and said predetermined minimum picture tube cut-off voltage;

means including a passive series resonant circuit coupled between said sweep transformer and said operating voltage source, and further including a rectifier coupled to said series resonant circuit, for developing an auxiliary DC voltage;

and means independent of said output load impedance for applying said auxiliary voltage to said output electrode to elevate its average operating voltage above the sum of said minimum cut-off voltage and said average bias voltage, for substantially avoiding black compression in said luminance amplifier.

References Cited

UNITED STATES PATENTS 3,274,336 9/1966 Pietrolewicz ---------- 178—7.5

3,395,313 7/1968 Rogers.
2,248,771 7/1941 Messner et al.
2,431,051 11/1947 Kozanowski -------- 328—258
2,637,011 4/1953 Schwarz -------------- 321—2

JOHN W. CALDWELL, Primary Examiner

R. L. RICHARDSON, Assistant Examiner

U.S. Cl. X.R.

178—7.5; 315—176; 328—258, 261; 330—202